United States Patent [19]

Hensel et al.

[11] Patent Number: 5,232,026
[45] Date of Patent: Aug. 3, 1993

[54] METHOD AND APPARATUS FOR THE WINDING OF ELECTRIC MACHINE COILS COMPRISING PARALLEL WIRES

[75] Inventors: Edgar Hensel, Altenstadt; Helmut Kolodziej, Oberursel; Edmund Gassner, Nidderau, all of Fed. Rep. of Germany

[73] Assignee: STATOMAT Spezialmaschinen GmbH, Fed. Rep. of Germany

[21] Appl. No.: 909,748

[22] Filed: Jul. 7, 1992

[30] Foreign Application Priority Data

Jul. 19, 1991 [DE] Fed. Rep. of Germany ........ 4123943

[51] Int. Cl.$^5$ ............................................. B21F 3/04
[52] U.S. Cl. .................................................. 140/92.1
[58] Field of Search .............................. 140/92.1, 92.2

[56] References Cited

U.S. PATENT DOCUMENTS

| | | |
|---|---|---|
| 3,346,021 | 10/1967 | Ross . |
| 3,514,837 | 6/1970 | Smith . |
| 3,672,026 | 6/1972 | Cutler et al. ................ 140/92.1 |
| 3,672,027 | 6/1972 | Arnold ......................... 140/92.1 |
| 3,872,897 | 3/1975 | Droll et al. ................... 140/92.1 |
| 3,967,658 | 7/1976 | Arnold ......................... 140/92.1 |
| 4,216,806 | 8/1980 | Bair et al. .................... 140/92.1 |
| 4,393,904 | 7/1983 | Muskulus ...................... 140/92.1 |
| 4,650,131 | 3/1987 | Droll et al. ................... 140/92.1 |

*Primary Examiner*—Lowell A. Larson
*Assistant Examiner*—Michael J. McKeon
*Attorney, Agent, or Firm*—Larson and Taylor

[57] ABSTRACT

A method and apparatus are provided for winding of coils comprising parallel wires onto a former (16) and for the axial insertion of the coils into a stator or rotor of an electric machine using a transfer tool (14). The coils are arranged in offset groups around the periphery of the transfer tool (14) and in order to generate coils so that there is no interruption in the coil wires and the wires are not twisted, and the coil windings are produced on the former (16) by rotating the former (16) jointly and in engagement with the transfer tool (14) in front of a wire guidance element (42) which is held so as to be substantially non-rotatable. During the joint rotation of the former and tool, the coil windings are slipped from the former (16) onto the transfer tool (14) at different relative angular positions.

7 Claims, 2 Drawing Sheets

5,232,026

METHOD AND APPARATUS FOR THE WINDING OF ELECTRIC MACHINE COILS COMPRISING PARALLEL WIRES

FIELD OF THE INVENTION

The invention relates to an improved method and apparatus for the winding of coils comprising parallel wires onto a former and for the axial insertion of several interconnected coils which are offset with respect to one another around the periphery into a stator or rotor of an electric machine by means of a transfer tool.

BACKGROUND OF THE INVENTION

A method and a corresponding apparatus of the general type referred to above are described, for example, in DE-OS 23 09 837 and DE-OS 28 08 048, which correspond to U.S. Pat. Nos. 3,872,897 and 4,221,243, respectively, and the transfer tool mentioned above basically comprises a hollow cylinder, having longitudinal slots therein, onto which the coil windings are slipped from the former during the winding operation. Under favorable circumstances, such an apparatus can also be used for the winding of coils comprising parallel wires, if only a few parallel wires are involved and the longitudinal slots of the transfer tool are wide enough to accommodate the wires which are caused to twist during winding by means of a rotating wire guidance element (a so-called flyer) and a stationary former. It should be understood that although such twisting or stranding of parallel wires occurs, it is, however, basically undesirable. Moreover, as the number of parallel wire is increased, a limit is very quickly reached at which the relatively thick coil windings formed from the twisted parallel wires no longer fit into the narrow longitudinal slots of the transfer tool.

Winding methods and apparatus are also known wherein parallel wires are wound onto a rotating former by means of a wire guidance element which is non-rotatable, and subsequently the complete coils are transferred onto a stator by means of a transfer tool so that the parallel wires do not twist. In this case, however, the coils windings cannot be slipped from the former onto the transfer tool during the actual winding stage. For this reason, the short formers that are customarily used cannot be employed and hence coils arranged in an offset manner around the periphery of the stator and interconnected by the uninterrupted wire, cannot be manufactured by this apparatus.

SUMMARY OF THE INVENTION

The invention is concerned with a method and apparatus of the general type discussed above which enables the production of coils or groups of coils comprising non-twisted parallel wires and arranged in an offset manner around the periphery of a stator or rotor of an electric machine.

The foregoing purpose or objective is achieved in accordance with the method of the invention wherein the coil windings are provided on the former by the rotation of the former, jointly and in engagement with the transfer tool, in association with a wire guidance element which is held so as to be substantially non-rotatable, and the coils are transferred, during joint rotation of the former and the transfer tool, from the former onto the transfer tool at different relative angular positions of rotation.

It has been surprisingly found that, due to the method according to the invention, the advantages of the two prior art methods discussed above are combinable without suffering the respective disadvantages of the two methods. Key to this is the novel feature of providing that the transfer tool rotates together with the former, even though the central longitudinal axis of the two units are not in alignment with one another. Although this generally dictates lower rotational winding speeds, the method of the invention permits the production and axial insertion of windings that could not otherwise be mechanically produced using presently available methods.

In a first practical embodiment of the method according to the invention, during the joint rotational movement of the former and the transfer tool, the central longitudinal axis of the former is moved along a circular path about the central longitudinal axis of the transfer tool. This embodiment can be used, for example, where the transfer tool, complete with the coils accommodated therein, is relatively large and heavy. In contrast, the other alternative embodiment, i.e., an embodiment in which the central longitudinal axis of the transfer tool is moved along a circular path about the central longitudinal axis of the former during the joint rotational movement, is preferred in such cases wherein it is desired to provide winding of the wire onto the former as simply as possible.

An apparatus for carrying out the method according to the invention comprises a former cooperating with a wire guidance element for the production of coil windings comprising parallel wires, and a transfer tool which is in engagement with the former during winding and is rotatably indexable relative to the former, and onto which the coil windings can be slipped from the former, such that the former is rotatably drivable jointly with the transfer tool, the wire guidance element being held or fixed so as to be substantially non-rotatable. In this apparatus the transfer tool can comprise transfer tongs by means of which the coils produced on the former are transferred onto an insertion tool for the axial insertion of the coils into a stator or rotor of an electric machine. The invention is even more advantageous where the insertion tool itself serves as a transfer tool, and thus the coil windings produced on the former can be slipped on directly into the insertion tool, because, in general, insertion tools used to provide axial insertion of coils into stator or rotor slots have narrower longitudinal slots that transfer tongs.

Other features and advantages of the invention will be set forth in, or apparent from, the following detailed description of preferred embodiments of the invention.

BRIEF DESCRIPTION OF THE DRAWINGS

Some practical embodiments of the invention are discussed in greater detail below in connection with the drawings wherein.

DESCRIPTION OF THE PREFERRED EMBODIMENTS

Figure 1:
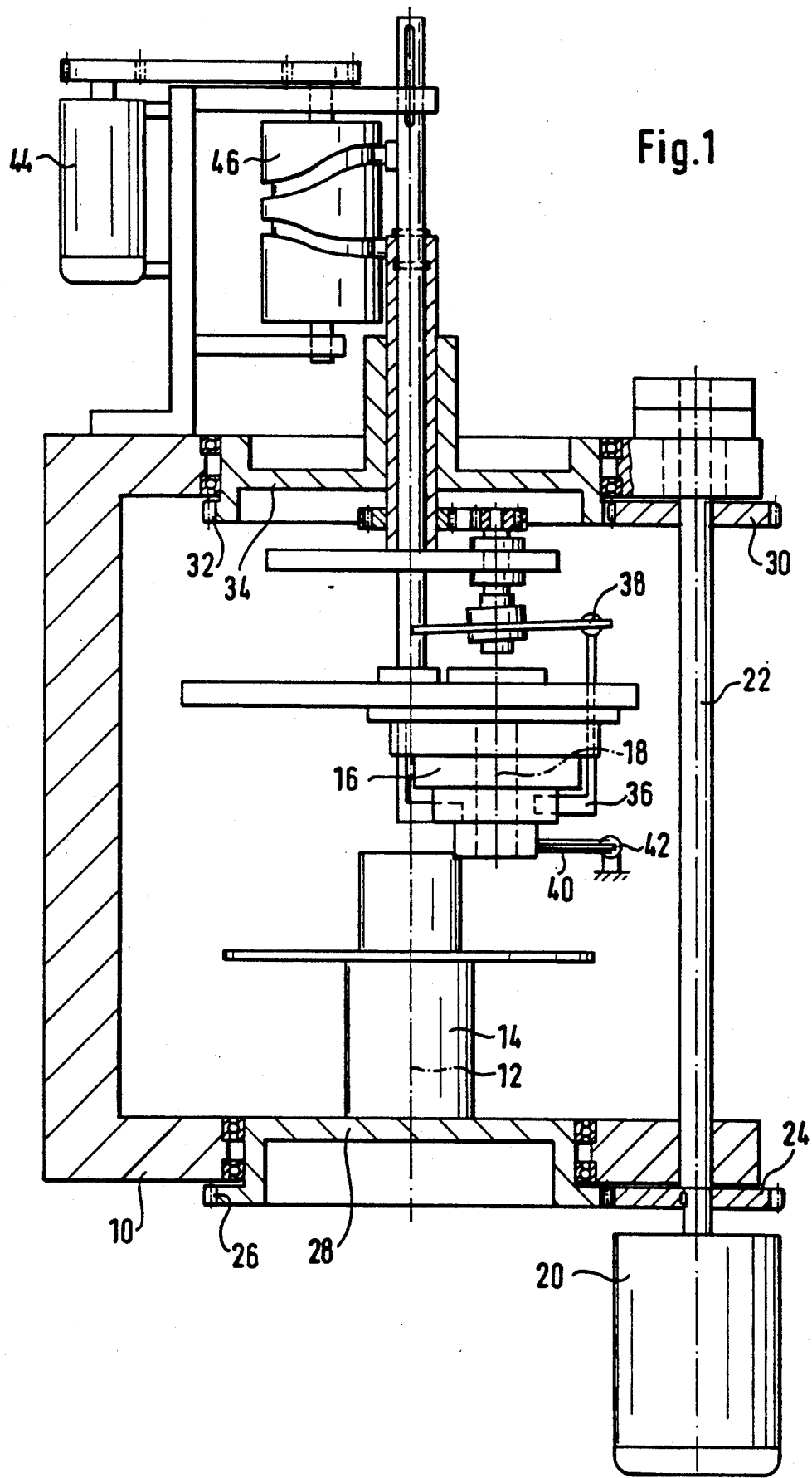
FIG. 1 is an axial sectional view through a coiling apparatus for the production of coils to be inserted into a stator.

Referring to the drawings, a winding device is shown in FIG. 1 which comprises a frame 10 on which a transfer tool 14 is mounted. The transfer tool 14 is, in the present case, an insertion tool, and has a vertical central longitudinal axis 12. Laterally offset above tool 14 is a former 16, the longitudinal axis of which is designated by 18, both the tool 14 and the former 16 are rotatably mounted on frame 10. In general, the insertion tool 14 and the former 16 can be conventional units of the type disclosed, for example, in the above-mentioned U.S. Pat. No. 3,872,897 and U.S. Pat. 4,221,243, the subject matter of which is hereby incorporated by reference. Further, the type of engagement provided between the former 16 and the insertion tool 14 during the winding process is the same as is provided in conventional winding devices. It differs, however, from that provided in prior art devices in that, during winding, the insertion tool 14 and the former 16 rotate in engagement with each other as one unit about the central longitudinal axis 12 of the insertion tool 14.

An electric motor 20 serves as the rotational drive unit, and the drive shaft 22 of motor 20 rotationally drives a rotatably mounted holding device 28 of the insertion tool 14 via a first gearwheel 24, and a rotatably mounted holding device 34 of the former 16 via a second gearwheel 30. The holding device 28 is provided with suitable outer gear teeth 26, and the holding device 34 is provided with suitable outer gear teeth 32. The gearing ratio of the gearwheels 24, 26 is the same as that of the gearwheels 30, 32 so that the two holding devices 28, 34 are driven simultaneously and at the same rotational speed.

As illustrated, the rotational axis of the holding device 34 is aligned with the central longitudinal axis 12 and also with the rotational axes of holding device 28 and the insertion tool 14. In other words holding device 34, transfer tool 14 and holding device 28 have coaxial or aligned axes of rotation. However, former 16 is eccentrically mounted on the holding device 34 in such a way that the central longitudinal axis 18 of the former 16 extends parallel to the rotational axis 12 but is laterally offset therefrom.

The former 16 includes several conventional steps or chambers which are wound consecutively. As is also conventional, the apparatus includes strippers 36 and, during the winding process, these strippers 36 provide that the windings are pushed forward one at a time from the winding level down towards the free end of the former 16 and are slipped onto the insertion tool 14 by the subsequent windings. At insertion tool 14, the coil windings are taken up and held in axial longitudinal slots. The short back and forth movement of the strippers 36 which is performed during each revolution of the former 16 is produced in a known manner by means of a wobbling disc 38, the structure and function of which are described in the above-mentioned patent DE-OS 23 09 837 (U.S. Pat. No. 3,872,897).

It is noted that instead of using the strippers 36, the wire windings can also be slipped during winding from the former 16 onto the insertion tool 14, in that winding is effected in each case onto a tapered area of the individual former chambers or steps. Under suitable winding conditions, the windings can slide of their own accord from the tapered area downwards into the insertion tool 14.

During winding, the parallel wires 40 are pulled off a magazine (not shown), and slide through a wire guidance element or device 42 which is only indicated schematically in FIG. 1 and which is mounted so as to be substantially non-rotatable with respect to the rotational axis 12. The wires 40 are then reeled up onto the former 16 as a consequence of the rotation of the latter. During winding of the wire onto the lowest, smallest former step (which during this phase, as shown in FIG. 1, engages with the bottom end thereof into the insertion tool 14), the wire guidance element 42 is located at a level closely adjacent to and above insertion tool 14.

After a predetermined number of wire windings have been produced on the lowest, smallest former step, the entire former 16 is pushed downwards by an electric motor 44 through the action of a motor-driven cam drum 46 by an amount equal to the width of a step of former 16 so that the second (next) former step then engages with the insertion tool 14. As the wire guidance element 42 and the strippers 36 remain at the level of the second former step, wire windings with a larger diameter are produced on the second former step, and these windings are, in turn slipped onto the insertion tool 14 one by one.

This operation continues until the top or upper former step is engaged with the insertion tool 14. After the selected number of windings has then been produced, the strippers 36 are advanced, by means of the electric motor 44 and the cam drum 46, downwardly to a position below the upper edge of the insertion tool 14 and thereafter the entire former 16 is pulled back upwardly, whereby any wire windings remaining on the former 16 are slipped off by the strippers 36 into the insertion tool 14.

It should be noted that depending on the cross-section of the former 16 and the desired winding speed, the wire guidance element 42 can also execute limited radial or peripheral movements during a revolution of the former 16 about the rotational axis 12. However, the movements are relatively short, back and forth movements, so that, in principle, the wire guidance element 42 is held so as to not rotate while the former 16 rotates.

Figure 2:
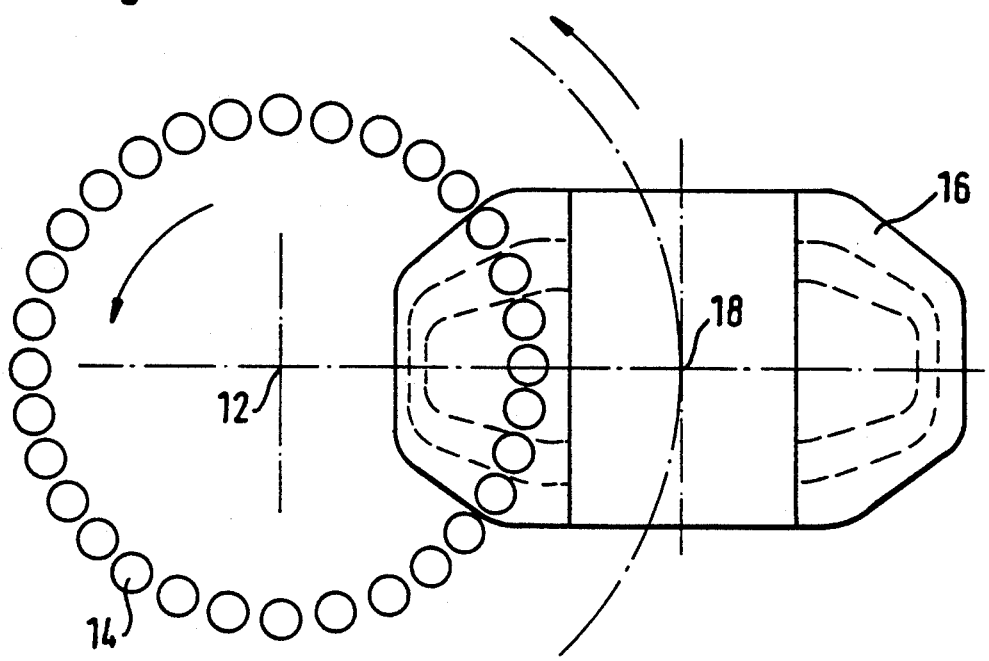
FIG. 2 is a simplified cross sectional view through the device according to FIG. 1, showing portions of the former and the transfer tool.
Figure 3:
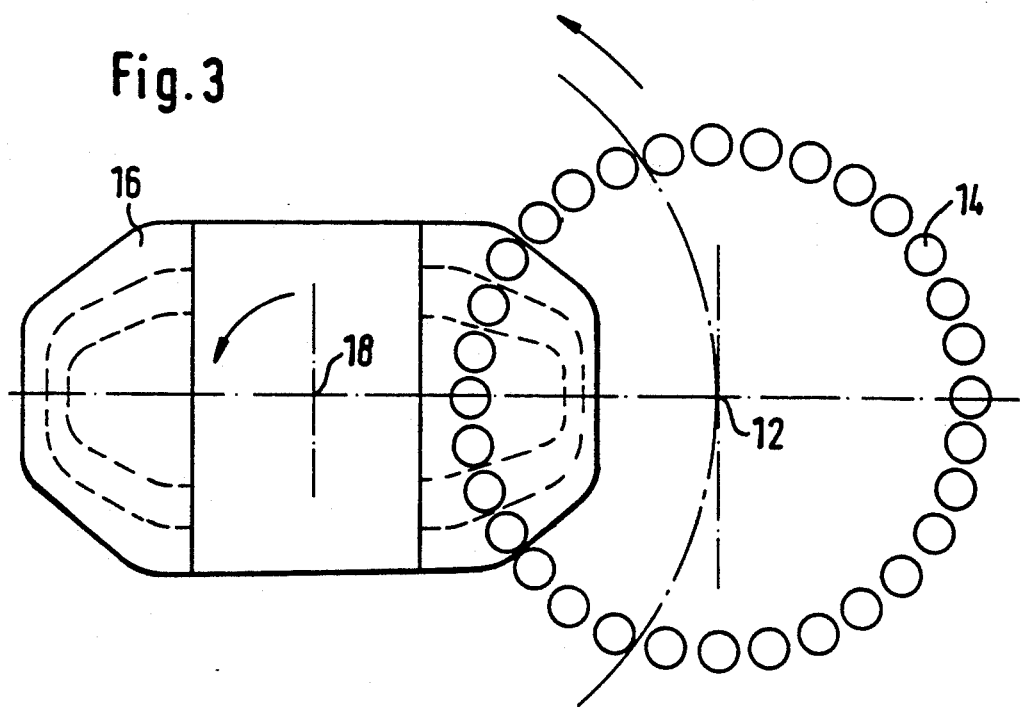
FIG. 3 is a view similar to that of FIG. 2 of another practical embodiment in which the joint rotating movement of the transfer tool and the former takes place about the longitudinal axis of the latter.

The rotational movements of the insertion tool 14 and the former 16 of the winding device according to FIG. 1 are shown diagrammatically in cross-section in FIG. 2. In contrast, FIG. 3 shows an alternative embodiment wherein the former 16 rotates about its central longitudinal axis (or about an axis located in the central area) and the insertion tool 14 also rotates about this axis but is laterally offset therefrom. The amount of lateral offset is predetermined by the engagement conditions existing between the former 16 and the insertion tool 14. Of course, it is also possible to permit the insertion tool 14 or, alternatively, the transfer tongs (not shown) and the former 16 to rotate about a common rotational axis which is neither the central longitudinal axis of the insertion tool 14 nor that of the former 16.

Initially, a primary group of coils comprising several coils corresponding to the various former steps can be produced by means of the device described above, consecutively and continuously, i.e., without any wire interruptions. After all of the coil windings in this group have been slipped off the former 16, the latter is temporarily pulled axially upwardly out of the insertion tool 14, the insertion tool 14 is then rotated through a selected angle, and the former 16 is subsequently brought back to the engagement position and the next group of coils are wound in the manner described. This process is repeated until all of the coils of a layer of coils which are to be inserted together into a stator have been wound, without any interruption in the wire. The insertion tool 14 is then brought to an insertion station in order to insert the coils, now comprising non-twisted parallel wires, axially into the stator in the conventional manner.

Although the present invention has been described relative to specific exemplary embodiments thereof, it will be understood by those skilled in the art that variations and modifications can be effected in these exemplary embodiments without departing from the scope and spirit of the invention.

What is claimed is:

1. A method for winding coils comprising parallel wires onto a former and for the axial insertion of a plurality of interconnected coils which are offset with respect to one another into a stator or rotor of an electric machine using a transfer tool, comprising a hollow cylinder with longitudinal slots therein, onto which coil windings are slipped from the former during the winding operation, said method comprising placing the coil windings on the former by rotating the former and the transfer tool as a unit so as to produce joint rotation of the former and the transfer tool, relative to a wire guidance means which is held so as to be substantially non-rotatable, and, during said joint rotation of the former and the transfer tool, slipping said coil windings from the former onto the transfer tool.

2. A method according to claim 1, wherein the former has a central longitudinal axis and wherein during said joint rotation, the central longitudinal axis of the former is moved along a circular path about the central longitudinal axis of the transfer tool.

3. A method according to claim 1, wherein the transfer tool has a central longitudinal axis and wherein during said joint rotation, the central longitudinal axis of the transfer tool is moved along a circular path about the central longitudinal axis of the former.

4. An apparatus for producing coil windings comprising parallel wires, said apparatus comprising a former cooperating with a wire guidance means for the production of coil windings of parallel wires, and a transfer tool which is engaged with the former during winding, said transfer tool being rotatably indexable relative to said former between winding operations, and the coil windings being slipped from the former onto the said transfer tool, said apparatus including means for producing joint rotation of the former and the transfer tool as a unit while the wire guidance means is held so as to be substantially non-rotatable.

5. Apparatus according to claim 4, wherein the transfer tool includes a central longitudinal axis and wherein the central longitudinal axis of the transfer tool is the axis about which said joint rotation of the former and the transfer tool takes place.

6. Apparatus according to claim 4, wherein the former includes a central longitudinal axis and wherein the central longitudinal axis of the former is the axis about which said joint rotation of the former and the transfer tool takes place.

7. Apparatus according to claim 4, wherein the transfer tool comprises an insertion tool.

* * * * *